United States Patent Office 3,126,937
Patented Mar. 31, 1964

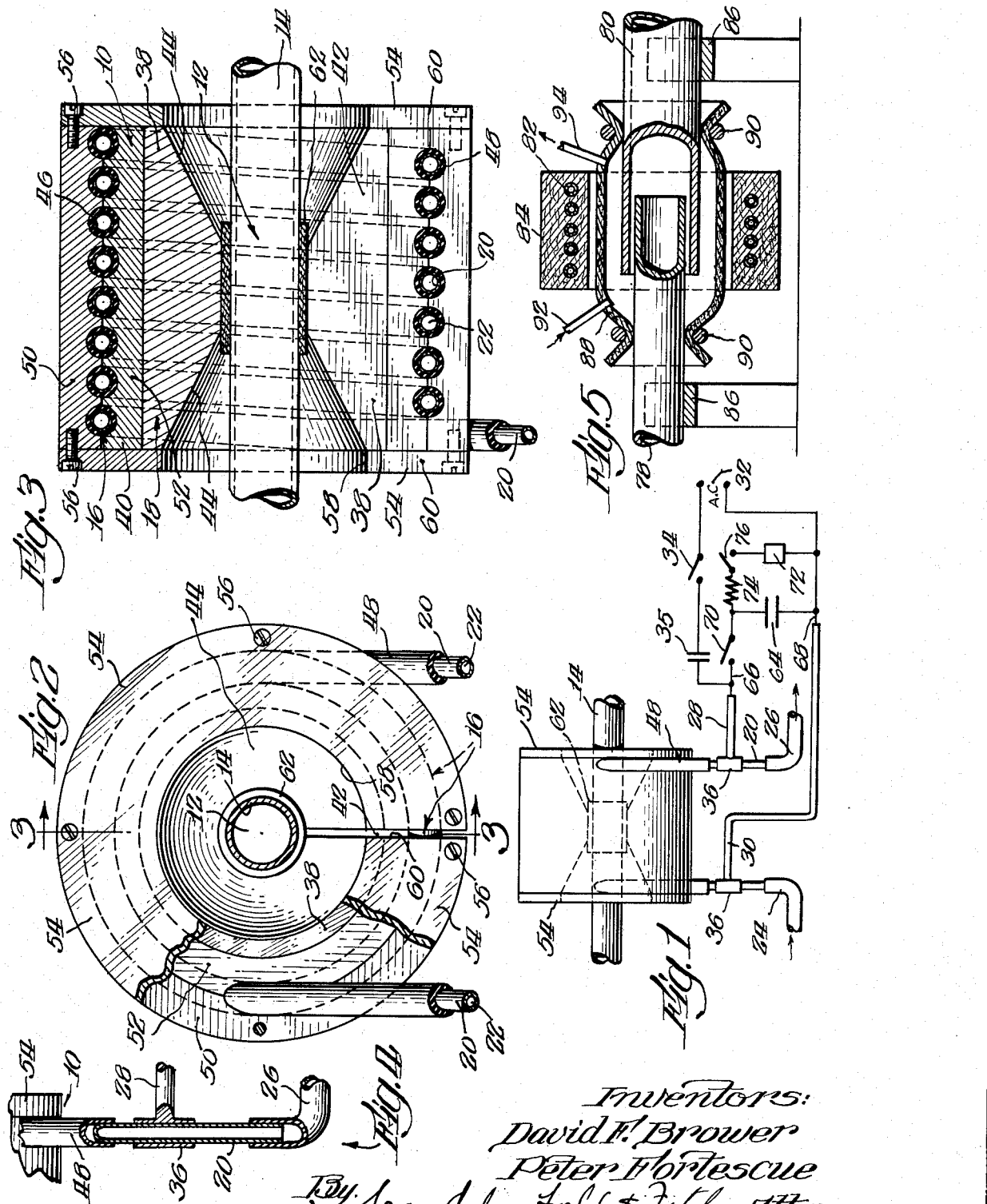

3,126,937
FORMING METHOD AND APPARATUS
THEREFOR
David F. Brower, San Diego, and Peter Fortescue,
Rancho Sante Fe, Calif., assignors to General
Dynamics Corporation, New York, N.Y., a corporation of Delaware
Filed Feb. 15, 1962, Ser. No. 173,479
10 Claims. (Cl. 153—10)

The present invention relates to a magnetic forming method and apparatus therefor, and more particularly to a method and apparatus for forming material wherein the material is preheated and then is formed by the application of a high intensity varying magnetic field.

In Patent No. 2,976,907, which issued March 28, 1961, a method and apparatus are set forth for forming material by employing a magnetic field of high flux density. In the described device, a magnetic field of high flux density is set up about a shaped conductor by passing a current pulse of high amperage through the conductor. The high density field induces a current in a metal work piece disposed in the magnetic field. The interaction between the high density magnetic field and the magnetic field produced by the induced current in the work piece produces an impulse on the work piece which, when made great enough, forms the metal work piece.

While the devices set forth in the above identified patent have proven to be of great practical utility in the forming of work pieces composed of certain metals, it has been difficult and/or impossible to form other metals because of their relatively low ductility. Also in certain applications the structural strength of the shaped conductor has been insufficient to form certain metal work pieces and/or the source of current pulses has been expensive to construct.

An object of the present invention is the provision of an additional method and apparatus for forming by employing the energy of a high intensity magnetic field. Another object of the invention is the provision of a method of forming a material wherein the material is preheated before it is formed by a magnetic field. A further object is the provision of a method of forming a work piece wherein the work piece is preheated by induction type heating and then the work piece is formed by employing the energy of a high intensity magnetic field. Still a further object is the provision of a magnetic forming device which is durable and efficient in operation and economical to manufacture.

Other objects and advantages of the present invention will become apparent by reference to the following description and accompanying drawings.

In the drawings:

FIGURE 1 is a schematic elevational view of a magnetic forming device which may be employed to practice a forming method in accordance with the present invention, a work piece to be formed being disposed in a centrally disposed work space;

FIGURE 2 is an enlarged end view of the magnetic forming device shown in FIGURE 1;

FIGURE 3 is an enlarged cross-sectional view taken generally along line 3—3 of FIGURE 2;

FIGURE 4 is an enlarged elevational view, partly in section, of a portion of FIGURE 1; and FIGURE 5 is a cross sectional view of another embodiment of a magnetic metal forming device in accordance with the present invention.

In accordance with the present invention the forming method generally comprises maintaining a work piece to be formed in a work space and preheating the work piece by setting up an alternating magnetic field in the work space. Thereafter a varying magnetic field of predetermined intensity and shape is established in the work space so as to transfer sufficient energy to the work piece to form the same in a desired manner.

For purposes of explanation the method is described hereinafter in connection with apparatus which may be employed to practice the method. More specifically, the apparatus shown in the drawings includes a means 10 for setting up an alternating magnetic field in a work space 12, which field intersects a work piece 14 disposed in the work space and thereby preheats the same by induction type heating. In the illustrated embodiment, the means 10 includes a transformer which has a primary winding 16 and a scondary winding 18.

The illustrated primary winding 16 is in the form of a coil or solenoid and is formed by a tubular conductor 20. The coil 16 is cooled by passing a coolant, such as water, through a passageway 22 defined by the central hollow portion of the conductor 20. In this connection, the ends of the coil are connected by flexible tubes 24 and 26 to a source of coolant (not shown).

A high frequency alternating current is passed through the coil by coupling the coil 16 through conductors 28 and 30 to a source 32 of alternating current, such as a rotating generator, converter, vacuum tube, oscillator, etc. A switch 34 is provided in series with the A.-C. source 32 to selectively control the passage of high frequency current to the coil. An isolating capacitor 35 is connected in series with the switch 34, the purpose of which is explained hereinafter.

As shown in FIGURE 4, the connection between the conductor 28 and one end of the coil 20 is provided by means of a T-shaped connector 36. The conductor 30 is connected in like manner to the other end of the coil. Each of the connectors 36 includes a hollow cross portion which is suitably joined to the associated end of the conductor forming the coil 20 in concentric relation thereto.

The secondary winding 18 of the transformer is a single turn formed by a split hollow member of conductive material, such as brass, beryllium copper, etc., disposed in the magnetic field established by the coil 16. The magnetic field intersects the member 18 and induces a current therein which flows along the surface thereof, the surface thereby serving as the single turn secondary winding.

More specifically, the illustrated hollow member 18 includes a hollow cylindrical core portion 38 and an annular outer concentric portion 40. The hole defined by the inner surface of the core portion 38 serves as the work space 12. A radially extending slot or gap 42 is provided between the work space 12 and the circumferential surface of the member 18 so that the current induced in the member 18 flows over the external surface of the member 18, along the walls of the gap 42 and around the surface of the work space 12. A conically shaped recess 44 is provided in each end of the core portion 38. Accordingly, the axial length of the work space 12 is shorter than the length of the circumferential surface of the member 18. This affords an increased current density in the walls of the work space for a purpose set forth hereinafter.

The member 18 is disposed in coaxial relationship with the coil 16, with the outer portion 40 thereof enclosing the coil. In this connection, the coil 16 is disposed in a spiral aperture 46 in the outer portion of the secondary winding 18. The coil 16 is insulated from the member 18 by an electrical insulation 48 in the form of a tube disposed over the tubular conductor. For maximum efficiency the thickness of the insulation 48 is made as small as is consistent with electrical insulation.

For manufacturing purposes, the outer portion 40 is made in two mating sections 50 and 52. To assemble the coil 16 in the outer portion 40, the mating surfaces of the sections 50 and 52 are coated with a suitable solder, the inner section 52 is disposed inside the outer section 50, the solder is melted and allowed to cool, and then the coil 16 is screwed into the spiral aperture 46.

In the illustrated embodiment the core portion 38 is made separate from the outer annular portion 40 so that another core portion, having a different size and/or shape of work space may be substituted therefor. The illustrated inner core portion 38 is made of a diameter such that electrical contact exists between the inner core portion 38 and outer portion 40. However, the inner core portion may be made smaller in diameter and insulated from the outer portion 40. Current will be then induced in the core portion rather than being directly communicated thereto.

The inner core portion 38 is maintained in position by a pair of circular end plates 54 of conductive material, such as brass, beryllium copper, which are attached to the outer portion 40 by means such as screws 56. An aperture 58 and a slot 60 are provided in each end plate 54 which correspond respectively to the base of the conical shaped recess 44 and to the slot 60 in the member 18.

In the illustrated embodiment, the forming device is employed to reduce the diameter of a tubular work piece of conductive material. The work piece 14 is disposed in the work space 12 and is insulated from the member 18 by a sleeve 62 of insulating material. The induced alternating current passing through the walls of the work space establish an alternating magnetic field in the work space 12 which, in turn, induces eddy currents in the work piece, thereby heating the same. Because of skin effect, induced currents in the work piece concentrate near the surface of the work piece. For efficient induction heating, the frequency of the alternating current source 32 is made high enough to make the depth of the current penetration less than the thickness of the wall of the tubular work piece. The alternating current is applied a sufficient length of time to heat the work piece sufficiently to make the work piece sufficiently ductile for forming but not long enough to melt the same.

After the work piece is preheated by the alternating current, a high intensity field is established in the work space 12 by passing a high amperage current pulse through the coil 16. The current pulse is provided by connecting a source of energy 64, such as a capacitor bank or a motor generator, through a pair of conductors 66 and 68 to the coil 16. Switch means 70, such as an ignitron, thyratron, etc., is connected between the coil 16 and the capacitor bank 64.

In the illustrated embodiment, the capacitor bank 64 is charged to a high voltage by a high voltage source 72 connected across the capacitor bank 64. A current-limiting resistor 74 and switch means 76 are connected in series with the voltage source 72. The limiting resistor 74 may be eliminated with certain power supplies.

For maximum efficiency, the energy stored in the source 64, and the resistance and inductance of the coil are made such that the magnetic field is set up in a time short compared with the time it takes the magnetic field to decay. Preferably, the desired magnetic field is set up in less than about 20 microseconds.

In operation, a tubular work piece to be formed is disposed in the work space 12, and the capacitor bank 64 is charged by closing the switch 76. After the capacitor bank 64 is charged the switch 76 is opened. The switch 34 is then closed thereby connecting the high frequency alternating current source to the coil 16. An alternating field is set up around the coil 16 and this field induces a current in the member 18, which current flows generally along the surface of the member 18. The A.-C. current flowing on the surface of the member 18, in turn, sets up an alternating magnetic field in the work space 12. This alternating field intersects the work piece thereby inducing eddy currents in the work piece. The eddy currents in the work piece heat the same to a desired temperature.

After the work piece is sufficiently heated, the switch means 70 associated with the capacitor bank 64 is closed, whereby a high amperage current pulse flows through the coil 16. The current pulse is prevented from flowing to the alternating current source by the isolating capacitor 35 which is of a capacity such that the high frequency current readily passes therethrough but a large amount of energy from the capacitor bank is prevented from being transmitted to the alternating current source.

A high intensity field is thus set up around the coil 16 and this field intersects the member 18 and induces a current therein. Since the length of the work space 12 is smaller than that of the circumferential surface of the member 18, the induced current flowing through the wall of the work space 12 is increased in density. This high density current, in turn, sets up a high intensity field in the work space, which field acts on the tubular work piece and reduces the diameter thereof.

In one illustrated embodiment of the forming device, the coil is formed of 8 turns of a ¼ inch diameter copper tube. The copper tube is disposed within a vinyl tube having a wall thickness of .020 inch. The coil is approximately 4 inches in diameter and approximately 4 inches long. The hollow member is composed of beryllium copper and is approximately 5 inches in diameter and 4 long. The work space is slightly greater than 1 inch in diameter and approximately 1 inch in length. Approximately ¼ gallon per minute of water is passed through the coil to cool the same. An abestos sleeve is employed to insulate the work piece from the hollow member.

A moblybdenum tube 1 inch in diameter and having a wall thickness of approximately .01 inch is reduced in diameter to approximately 0.7 inch by the above device by applying an alternating current source, having a frequency of 100,000 cycles per second at a power level of about 5 kilovolts to the coil, for approxiamtely 10 seconds. A current pulse of 50,000 amperes is then passed through the coil by connecting the coil to a 700 microfarad capacitor bank which is charged to 8 kilovolts. This current produces a field of approximately 150,000 gauss in the work space at the surface of the work piece.

In certain forming operations, it is desirable to protect the work piece from the ambient atmosphere. This may be accomplished by operating the device shown in FIGURES 1 to 4 in a vacuum or an inert atmosphere. For more efficient operation, the work piece, as shown in FIGURE 5, is preferably enclosed in a shroud having an inert gas supplied thereto.

As shown in FIGURE 5, the forming device is employed to weld a pair of telescoped tubular work pieces 78 and 80 together. As illustrated, the forming device includes a water cooled coil 82 of conductive material which is disposed in an annular support member 84 made of a structural material such as fiber glass. The coil 82 is connected to a high frequency source (not shown) and a high amperage pulse source (not shown) which may be similar to that shown in FIGURE 1.

The work pieces 78 and 80, which are coaxially supported within the coil 82 by suitable clamps, are protected from the ambient atmosphere, and the coil 82 is protected from the heat generated in the hot work pieces 78 and 80, by a generally tubular shroud 88 of thermal and electrical insulating flexible material such as asbestos which encompasses the telescoped portions of the work pieces 78 and 80. The ends of the shroud 88 are clamped to the work pieces 78 and 80 by suitable binding means 90 such as wire clamps. An inlet 92 and an outlet 94 for inert gas are suitably connected to the shroud.

The work pieces 78 and 80 are welded together by operating the device shown in FIGURE 5 in the same manner as the device shown in FIGURES 1 to 4. Because of the short time involved in the forming operation, the shroud 88, even though it is made of porous material, is suitable for maintaining the inert atmosphere about the work pieces 78 and 80.

The size and shape of the work space depends upon the initial and desired final shape of the work piece. Suitable dies may also be provided in the work space. Moreover, the work space may be designed so that by inversion (i.e., the magnetic field is applied to the inside of a hollow work piece), the metal is expanded rather than compressed by the magnetic field. For example, in such an application, the member 18 would not be employed, and a tubular work piece would be disposed about the coil 16.

From the above it can be seen that the present invention provides a method and apparatus for forming a work piece. The forming may include shaping, embossing, engraving, etc. Also, the means for setting up the magnetic field may be a flat coil, a hair pin shaped coil, a spirally shaped coil, etc. Preferably, the coil should be cooled to avoid overheating. By the preheating of the work piece, the workability of the work piece is improved. The amount of force required to form the metal work piece is also reduced. This reduces the stress on the magnetic forming device and also reduces the size of the capacitor bank necessary to produce the desired force.

Also, the preheating and the forming of the work piece in the same device avoids the time delay that otherwise would occur in moving the work piece between separately constituted apparatus. Moreover, since in the present device there is no mechanical contact between the force applying means and the work piece, the device is particularly adapted to form the preheated work piece.

Various other changes and modifications may be made on the above described method and apparatus for forming without deviating from the spirit and scope of the present invention.

Various features of the invention are set forth in the accompanying claims.

What is claimed is:

1. A method of forming a work piece comprising passing a current through the work piece to preheat without forming the same, and then establishing a varying magnetic field of predetermined intensity and shape at the surface of the work piece, said field being sufficient to form the work piece in a desired manner.

2. A method of forming a work piece comprising establishing an alternating magnetic field which intersects the work piece to thereby induce eddy currents in the work piece for preheating without forming the same, and then establishing a varying magnetic field of predetermined intensity and shape at the surface of the work piece, said field being sufficient to form the work piece in a desired manner.

3. A method of forming a work piece comprising passing an alternating current through a coil disposed about the work piece to be formed, whereby eddy currents are induced in the work piece to thereby preheat without forming the same, and then passing a high amperage current pulse through the coil so as to thereby transfer sufficient energy to the work piece to form the work piece in a desired manner.

4. A method of forming a work piece comprising disposing the work piece in an essentially oxygen free atmosphere, passing an alternating current through a coil disposed about the work piece to be formed, whereby eddy currents are induced in the work piece to thereby preheat without forming the same, and then passing a high amperage current pulse through the coil so as to thereby transfer sufficient energy to the work piece to form the work piece in a desired manner.

5. A magnetic metal forming device comprising a conductor shaped to provide a magnetic field of a predetermined shape, an energy storage means, a source of alternating current, and means for selectively connecting said source and said energy storage means to said conductor, the energy stored in said energy storage means being sufficient to form a work piece disposed in the magnetic field after the work piece has been preheated without forming by an alternating field produced by connecting said alternating current source to said coil.

6. A magnetic metal forming device comprising a conductor shaped to provide a magnetic field of a predetermined shape, means disposed in said magnetic field for protecting a work piece to be formed from the ambient atmosphere, an energy storage means, a source of alternating current, and means for selectively connecting said source and said energy storage means to said conductor, the energy stored in said energy storage means being sufficient to form the work piece disposed in the protecting means after the work piece has been preheated without forming by an alternating field produced by connecting said alternating current source to said coil.

7. A magnetic metal forming device comprising a single turn coil having a portion thereof shaped to provide a magnetic field of a predetermined shape, a multi-turn coil disposed in an inductive relationship with said single turn coil, an energy storage means, a source of alternating current, means selectively connecting said alternating current source and said energy storage means to said multi-turn coil, the frequency of said alternating current source being high enough so that the depth of current penetration in a work piece disposed in said portion is considerably less than the thickness of the work piece, the energy in said energy storage means being such that the magnetic field produced in said portion is of sufficient amplitude and effective for a length of time sufficient to transfer the necessary energy to the work piece to form the work piece after it has been preheated without forming by connecting the alternating current source to the coil.

8. A magnetic forming device comprising a cylindrical member of conductive material, said member having an axially extending aperture therein and a laterally extending slot extending between the external surface thereof and the aperture, a coil of conductive material disposed in said cylindrical member in coaxial relationship therewith, means insulating said coil from said cylindrical member, a source of energy, an alternating current source, means for selectively connecting said alternating current source and said source of energy to said coil, the energy in said source being of such a magnitude that a sufficiently intense field is set up in the aperture to form a work piece disposed therein in a desired manner after the work piece has been preheated without forming by connecting the alternating current source to the coil.

9. A magnetic forming device comprising a cylindrical member of conductive material, said member having an axially extending aperture therein, a laterally extending slot extending between the external surface thereof and the aperture, the axial length of the aperture being smaller than the length of the circumferential surface of the member, a coil of conductive material disposed in said cylindrical member in coaxial relationship therewith, means insulating said coil from said cylindrical member, a source of energy, an alternating current source, means for selectively connecting said alternating current source and said source of energy to said coil, the energy in said source being of such a magnitude that a sufficiently intense field is set up in the aperture to form a work piece disposed therein in a desired manner.

10. A magnetic forming device comprising a cylindrical member of conductive material, said member having an axially extending aperture therein, a laterally extending slot extending between the external surface thereof and the aperture, and a spiral aperture near the circumferential surface thereof, the axial length of the aperture being smaller than the length of the circumferential surface of the member, a hollow conductor disposed in said spiral aperture, means insulating said conductor from said cylindrical member, means connected to said conductor for passing a coolant therethrough, a source of energy, an alternating current source, means for selectively connecting said alternating current source and said source of energy to said conductor, the energy in said source being of such a magnitude that a sufficiently intense field is set up in the aperture to form a work piece disposed therein in a desired manner.

References Cited in the file of this patent

UNITED STATES PATENTS

| | | |
|---|---|---|
| 2,976,907 | Harvey et al. | Mar. 28, 1961 |
| 3,088,200 | Birdsall et al. | May 7, 1963 |
| 3,092,165 | Harvey | June 4, 1963 |